US005759511A

United States Patent [19]

Diemer, Jr. et al.

[11] Patent Number: 5,759,511
[45] Date of Patent: Jun. 2, 1998

[54] GRANULAR SCRUBS FOR USE IN MANUFACTURING TITANIUM DIOXIDE PIGMENT

[75] Inventors: Russell Bertrum Diemer, Jr., Wilmington; Narayanan Sankara Subramanian, Hockessin; David A. Zimmerman, Wilmington, all of Del.

[73] Assignee: E. I. du Pont de Nemours and Company, Wilmington, Del.

[21] Appl. No.: 703,303

[22] Filed: Aug. 26, 1996

[51] Int. Cl.⁶ .................................................. C01G 23/047
[52] U.S. Cl. ............................................................. 423/613
[58] Field of Search ................................ 423/613; 106/437

[56] References Cited

U.S. PATENT DOCUMENTS

| | | | |
|---|---|---|---|
| 2,721,626 | 10/1955 | Rick | 183/119 |
| 3,208,866 | 9/1965 | Lewis et al. | 106/300 |
| 3,433,594 | 3/1969 | Wilson et al. | 23/202 |
| 3,475,258 | 10/1969 | Rahn et al. | 165/1 |
| 3,505,091 | 4/1970 | Santos | 106/300 |
| 3,511,308 | 5/1970 | Nerlinger | 165/1 |
| 4,937,064 | 6/1990 | Gonzalez | 423/613 |
| 5,201,949 | 4/1993 | Allen et al. | 106/436 |
| 5,372,639 | 12/1994 | Gonzalez et al. | 106/437 |

FOREIGN PATENT DOCUMENTS

| | | | |
|---|---|---|---|
| 6614735 | 4/1967 | Netherlands | 423/613 |

*Primary Examiner*—Steven Bos

[57] ABSTRACT

This invention relates to an improved process for making titanium dioxide pigment, wherein granular scouring particles (scrubs) comprising specific water-soluble salts (KCl, CsCl, or mixtures thereof) are introduced into a cooling conduit containing a hot gaseous suspension of titanium dioxide particulate. The process provides titanium dioxide pigment having higher carbon black undertone (CBU) levels.

14 Claims, No Drawings ated in the presence of a nucleant. For example, Allen et al., U.S. Pat. No. 5,201,949 discloses a method for making $TiO_2$ pigment, wherein $TiCl_4$ vapor is oxidized in the presence of water vapor and a nucleant consisting essentially of a cesium substance. The oxidation occurs at high pressure or at a short residence time of the reactants in the mixing zone of the reactor to produce $TiO_2$ pigment having improved CBU and gloss properties.

GRANULAR SCRUBS FOR USE IN MANUFACTURING TITANIUM DIOXIDE PIGMENT

BACKGROUND OF THE INVENTION

1. Field of the Invention

The present invention relates to an improved process for making titanium dioxide pigment, wherein granular scrubs comprising a water-soluble salt are used for cooling a hot gaseous suspension of titanium dioxide particulate in a cooling conduit.

2. Description of the Related Art

In producing pigmentary titanium dioxide ($TiO_2$), a titanium tetrahalide such as titanium tetrachloride ($TiCl_4$) in the vapor phase is reacted with an oxygen-containing gas in a reactor at a temperature in the range of about 900° to 1600° C. to produce a hot gaseous suspension of $TiO_2$ solid particulate and free chlorine. This hot gaseous suspension must be quickly cooled below 600° C. within about 1–60 seconds following discharge of the suspension from the reactor. This cooling is accomplished in a conduit, e.g., a flue, which is externally cooled with flowing water so that undesired $TiO_2$ particle size growth is prevented and particle agglomeration is minimized. Particle size and particle agglomeration are important $TiO_2$ pigment properties.

The particle size of the $TiO_2$ pigment is measured in terms of carbon black undertone (CBU). Pigments containing smaller sized particles have a relatively high CBU, and finished products (e.g., paints, plastics, etc.) containing such pigments tend to have a bluish tint. Pigments with larger sized particles have a relatively low CBU and finished products containing such pigments tend to have a more yellowish tint. The particle agglomeration of the pigment is typically measured in terms of its particle size distribution (coarse tail). Pigments, wherein a low weight percentage of the particles (e.g., less than 30%) have a particle diameter size greater than 0.6 microns, tend to have low particle agglomeration and finished products made with such pigments tend to have high gloss. Pigments, wherein a high weight percentage of the particles have a particle diameter size greater than 0.6 microns, tend to have greater particle agglomeration and finished products made with such pigments tend to have less gloss.

It is known that the production of titanium dioxide pigment may be improved when the $TiCl_4$ and an oxygen-containing gas are reacted in the presence of a nucleant. For example, Allen et al., U.S. Pat. No. 5,201,949 discloses a method for making $TiO_2$ pigment, wherein $TiCl_4$ vapor is oxidized in the presence of water vapor and a nucleant consisting essentially of a cesium substance. The oxidation occurs at high pressure or at a short residence time of the reactants in the mixing zone of the reactor to produce $TiO_2$ pigment having improved CBU and gloss properties.

Lewis et al., U.S. Pat. No. 3,208,866 discloses a method for producing $TiO_2$ pigment by the oxidation of TiCl4 vapor in the presence of a metal ion nucleant selected from the group consisting of sodium, potassium, lithium, rubidium, cesium, calcium, barium, strontium and cerium. The method provides $TiO_2$ pigment having improved particle size uniformity, color, and in-process bulk density.

However, in the manufacturing methods disclosed in the foregoing patents, the $TiO_2$ particles have a strong tendency to deposit on the inner walls of the cooling conduit. The cooled $TiO_2$ particles tend to form adherent layers on the inner walls and can cause plugging of the conduit. Further, the $TiO_2$ deposits are poor heat conductors and the internal surfaces of the cooling conduit can become insulated which inhibits the heat-exchange properties of the conduit. In the past, some manufacturing methods which involve oxidizing $TiCl_4$ and an oxygen-containing gas in the presence of a nucleant have used NaCl granular scrubs in order to remove $TiO_2$ particulate deposits from the internal surfaces of the cooling conduit. Although the NaCl scrubs have been somewhat effective in removing the $TiO_2$ deposits and producing good quality pigment, there is a need for an improved process.

It has now been found that in methods for making $TiO_2$ pigment, wherein the $TiCl_4$ and an oxygen-containing gas are reacted in the presence of a nucleant, the method may be improved by adding granular scouring particles (scrubs) comprising specific water soluble salts (KCl, CsCl, or mixtures thereof) to the conduit which cools the hot gaseous suspension of $TiO_2$ particulate. This process produces $TiO_2$ pigment having improved CBU levels and helps to minimize particle agglomeration. The process can be run at a high production rate to produce $TiO_2$ pigment having high CBU levels.

It is also recognized that the art includes methods for making $TiO_2$ pigment which do not specify oxidizing $TiCl_4$ in the presence of a nucleant but which describe using a variety of granular scrubs for removing $TiO_2$ deposits from the internal surfaces of cooling conduits. For example, Rick, U.S. Pat. No. 2,721,626 discloses adding relatively dense, hard abrasive particles into the hot suspension of $TiO_2$ particulate. The granular scrubs mentioned are sand, sintered particles of titanium dioxide, mullite or refractory alumina particles. The particle size of the scrubs is described as being in the range of 100 mesh to ¼ inch.

Rahn et al., U.S. Pat. No. 3,475,258 discloses the use of solid, inorganic water-soluble salts to remove metal oxide deposits, such as $TiO_2$ particle scale, from the internal surfaces of indirect heat exchange apparatus. Such inorganic salts are removed from the product stream with other water-soluble impurities during aqueous treatment of the metal oxide particles. The particle size of the salts is described as being in the range of 200 mesh to ¼ inch. The metal halides of alkali metals, alkaline earth metals, aluminum, zirconium, and mixtures thereof are described as being suitable for use as the salts in this process. The halides, especially chlorides of sodium, potassium and calcium are described as being economically preferred.

Nerlinger, U.S. Pat. No. 3,511,308 discloses adding a particulate, anhydrous, water-soluble salt having a melting point above about 700° C. and a hardness on the Mohr scale not greater than about 5 to the hot gaseous suspension of $TiO_2$ solids. After the suspension has been cooled, the salt is separated from the $TiO_2$ solids by dissolving the salt and recovering the solids. The particle size of the salts is described as being in the range from 100 mesh to 4 mesh. Sodium chloride is preferred due to its availability in pure form.

The present invention provides an improved process for making $TiO_2$ pigment, wherein the $TiCl_4$ and an oxygen-containing gas are reacted in the presence of a nucleant. The improvement involves adding scouring particles comprising specific water soluble salts (KCl, CsCl, or mixtures thereof) to the cooling conduit.

SUMMARY OF THE INVENTION

The present invention relates to an improved process for producing titanium dioxide pigment, comprising the steps of:

a) mixing a titanium tetrahalide and aluminum halide and oxidizing the mixture in the vapor phase in the presence of a nucleant to form a gaseous suspension of titanium dioxide particulate;
b) passing the suspension of titanium dioxide particulate to a cooling conduit; the improvement comprising introducing into the cooling conduit scouring particles comprising a water soluble salt selected from the group consisting of KCl, CsCl, and mixtures thereof.

Preferably, the titanium tetrahalide is titanium tetrachloride and the aluminum halide is aluminum chloride. The nucleant is preferably a compound comprising an element selected from the group consisting of sodium, potassium, lithium, rubidium, cesium, calcium, barium, strontium, and cerium.

The oxidation of the titanium tetrachloride/aluminum chloride mixture may occur by mixing and reacting the mixture and an oxygen containing gas in the presence of water vapor in a reactor having a reaction zone at a temperature of at least 800° C. and at a pressure of at least 10 pounds per square inch gage. The oxidation of the titanium tetrachloride/aluminum chloride mixture may also occur by mixing and reacting the mixture and an oxygen containing gas in the presence of water vapor in a reactor having a reaction zone and mixing zone, wherein the temperature in the reaction zone is at least 800° C. and the residence time of the reactants in the mixing zone is about 1 to 25 milliseconds.

Preferably, the scouring particles comprise KCl, and the nucleant is KCl or CsCl. Alternatively, CsCl may be used as the scouring particles and the nucleant may be KCl or CsCl. Preferably, the diameter size of the KCl and/or CsCl scouring particles is in the range of about 60 mesh to about 0.5 inches.

DETAILED DESCRIPTION OF THE INVENTION

The present invention provides an improved process for producing titanium dioxide ($TiO_2$) pigments, comprising the following steps:
1) mixing a titanium tetrahalide and aluminum halide to form a mixture;
2) oxidizing the mixture in the vapor phase in the presence of a nucleant to form a gaseous suspension containing titanium dioxide particulate;
3) passing the suspension of $TiO_2$ to a cooling conduit; and
4) introducing scouring particles comprising a water-soluble salt selected from the group consisting of KCl, CsCl, and mixtures thereof into the cooling conduit.

The production of $TiO_2$ pigment by vapor phase oxidation of a tetrahalide, particularly TiCl4, in the presence of a nucleant is known and disclosed in Lewis et al., U.S. Pat. No. 3,208,866 and Allen et al., U.S. Pat. No. 5,201,949, the disclosures of which are incorporated herein by reference. The present invention relates specifically to an improvement in the aforementioned processes.

In the production of $TiO_2$ pigment by the vapor phase oxidation of titanium tetrahalide, various titanium tetrahalides such as titanium tetrachloride, titanium tetrabromide, and/or titanium tetraiodide may be used, but it is preferable to use $TiCl_4$. First, $TiCl_4$ is evaporated and preheated to temperatures of from about 300° to about 650° C. and introduced into a reaction zone of a reaction vessel. Aluminum halides such as $AlCl_3$, $AlBr_3$ and/or $AlI_3$ in amounts sufficient to provide about 0.5 to about 10% $Al_2O_3$, preferably about 0.5 to about 5%, and more preferably about 0.5 to about 2% by weight based on total solids formed in the oxidation reaction are thoroughly mixed with the $TiCl_4$ prior to its introduction into the reaction zone of the reaction vessel. Preferably, $AlCl_3$ is used in the process of this invention. However, it is also recognized that other co-oxidants and rutile promoters may be added at this point or further downstream in the process.

The oxygen containing gas is preheated to at least 1200° C. and is continuously introduced into the reaction zone through a separate inlet from an inlet for the $TiCl_4$ feed stream. By "reaction zone", it is meant the length of the reactor in which substantial reaction of the reactants takes place. The reaction of $O_2$ and $TiCl_4$ in the vapor phase is extremely fast and is followed by a brief period of particle growth. The oxygen containing gas which is introduced into the reaction zone contains a nucleant. By "nucleant", it is meant any substance which can reduce the particle size of the pigment such as metals, oxides, salts, or other compounds of sodium, potassium, lithium, rubidium, cesium, calcium, barium, strontium, or mixtures thereof. The salts, CsCl and KCl, are preferred for use in this invention.

The pressure for carrying out the oxidation reaction is preferably at least 10 pounds per square inch gage (psig). More preferably, the pressure will be at least 20 psig. The upper pressure limit can be the practical upper limits of the process, e.g., 200 psig. The residence time of the reactants in the mixing zone of the reactor should be at least 1 millisecond, preferably at least 3 milliseconds. The maximum residence time should be about 25 milliseconds. Typically, the residence time is in the range of about 1–25 milliseconds. By "mixing zone", it is meant the length of the reactor in which substantial mixing of the reactants takes place. The reaction temperature should be at least 800° C. and preferably in the range of about 800° to 1800° C. Preferably, the reaction occurs in the presence of water vapor.

The hot gaseous suspension of $TiO_2$ particulate is then rapidly cooled in order to prevent undesirable particle growth. In accordance with this invention, cooling of the hot gaseous suspension may be performed by methods known in the art. These methods typically involve passing the hot gaseous suspension through a cooling conduit having relatively cool walls in comparison to the gaseous suspension. The walls of the conduit are typically cooled by passing cool fluid externally over the walls. For example, the conduit may be immersed in cool water. Various forms of conduits or flues which are preferably cooled by water externally, may be used in the process of this invention. Examples include, but are not limited to, conventional round pipes and conduits which are described in greater detail in U.S. Pat. Nos. 2,721,626; 3,511,308; 4,462,979; 4,569,387; and 4,937,064 (finned flue). The benefits provided by the process of this invention may be especially apparent as the diameter of the conduit is increased. As the hot $TiO_2$ particles come in contact with the relatively cooler surfaces of the inner walls, the particles deposit on the walls and cool to form adherent layers. These deposits and scale reduce the cooling rate of the reaction mass thereby affecting the quality of the pigment formed.

The present invention provides an improved process, wherein granular scouring particles comprising certain water-soluble salts are introduced into conduit, to remove the $TiO_2$ deposits and substantially improve the quality of pigment formed.

The granular scouring particles employed in this improved process comprise a water-soluble salt selected from the group consisting of KCl, CsCl, and mixtures thereof. Surprisingly, it has been found that when KCl or CsCl salts are used, the resulting TiO$_2$ pigment has significantly higher CBU values than TiO$_2$ pigment produced by a process which uses NaCl as the scouring particles.

In this invention, the scouring particles preferably have a diameter (size distribution) in the range from about 60 mesh (0.0098 inches or 0.250 mm) to about 0.5 inches (12.7 mm) Preferably at least 80% of the particles will be of a size 10 mesh (0.0787 inches or 2.00 mm) or larger. More preferably at least 90% of the particles will be of a size 10 mesh or larger. Particle size distribution of the scouring particles is very important since use of proper size is essential in providing scrubbing action. If the particle size is too small, this will result in the scouring particles melting and not providing the scrubbing action. If the particle size is too large, this may cause feeding problems and insufficient surface area to provide the scrubbing required.

The amount of scouring particles used is variable and will depend upon the particular needs. Typically, the addition of an amount of scouring particles ranging from about 0.5 to 20 wt. % scouring particles, preferably from about 3 to 10 wt. %, based on total TiO$_2$ suspended solids will be found adequate to effect the desired removal of accumulated pigment deposits and will allow a relatively high, uniform rate of heat removal from the product stream. It will be appreciated by those skilled in the art that enough scouring particles must be added to bring the reaction mass at the end of the conduit to a temperature compatible with downstream process equipment such as cyclones, filters, screw conveyers, etc. Such temperatures are in the range of about 100° to about 600° C.

The scouring particles can be added to the conduit by any suitable means. For example, the scouring particles can be added intermittently or continuously by gravity from a hopper (or bin) through a solids metering valve to the flue. Continuous feeding to the TiO$_2$ suspension under treatment is preferred. The scouring particles can be added at any convenient point in the system but are most conveniently added at the front end of the conduit as the product stream discharges from the reactor. Further, the scouring particles can be added at a multiple of addition points and especially at those points adjacent to which a relatively severe build-up occurs due to the configuration of the apparatus, such as at return or other forms of bends employed in the system.

The water-soluble scouring particles can be removed from the TiO$_2$ pigment during conventional subsequent wet-treatment steps.

The improved process of this invention provides many advantages. In general, the process is effective in cooling hot suspensions of particulate TiO$_2$ in corrosive, chlorine-containing gases by a rapid and efficient heat-exchange technique. This process minimizes the deleterious effect which build-up of the cooled solids on the surfaces would otherwise produce while further improving pigment properties. The process of this invention results in improved TiO$_2$ pigment properties by control of the primary particle size and level of particle agglomeration. The KCl and/or CsCl scouring particles disperse more efficiently and provide a means to effectively cool down the suspension of particulate at the front end of the conduit where the pigmentary properties are primarily set. These scouring particles are also effective in cooling down the particulate in the remainder of the conduit where the pigment is brought down to lower temperatures for handling.

If it is desirable to improve the quality of the pigment being produced, then the improved process may be run at the given set of conditions (pressure, reaction temperature, etc.), and the quality of the pigment, as measured in terms of the CBU, will be improved. If it is desirable to increase the production rate of the pigment, then the process conditions (pressure, reaction temperature, etc.) can be appropriately adjusted, and the improved process may be run at these high production conditions without a loss in quality of pigment.

While not wishing to be bound by any theory, it is believed that when granular scrubs are added to cooling conduits containing hot gaseous suspensions of TiO$_2$, they effectively scour the internal surfaces of the conduit. It is further believed that the specific process of this invention is effective in producing TiO$_2$ pigment having high CBU levels due to the interaction of the nucleant and the specific granular scrubs (KCl and/or CsCl).

The present invention is further illustrated by the following examples, but these examples should not be construed as limiting the scope of the invention.

TEST METHODS

Carbon Black Undertone

The carbon black undertone (CBU) of a TiO$_2$ pigment sample is measured according to the methods described in U.S. Pat. Nos. 2,488,439 and 2,488,440, the disclosures of which are hereby incorporated by reference, using a benchmark value of 10 rather than 100 as used in the patents. The CBU is measured by mulling together a suitable liquid, such as light colored oil, the TiO$_2$ pigment sample, and carbon black. The mixture is spread on a panel and the relative blueness of the gray mixture is observed. Pigments containing smaller sized particles have a relatively high CBU and a bluer undertone. Pigments with larger sized particles have a relatively low CBU and have a more yellowish undertone.

EXAMPLES

EXAMPLES 1-2

Comparative Example A-B

Employing a vapor phase oxidation reactor as described in U.S. Pat. Nos. 2,488,439; 2,488,440; 2,559,638; 2,833,627; 3,208,866; 3,505,091; and 5,201,949, a series of trials were run using KCl scouring particles of this invention and NaCl scouring particles as comparison. Process and additive conditions (rate, pressure, temperatures, purges, and concentration of additives such as AlCl$_3$ rutile promoter, KCl or CsCl nucleants, etc.) were held constant throughout each trial and were as follows:

TiCl$_4$—400° C.
O$_2$—10–15% excess at 1550° C.
Reaction Temperature—1550° C.
Pressure—50 psig
Production Rate of TiO$_2$—Al$_2$O$_3$—4.5 tons per hour
Feed Rate of Scouring Particles—5–10 wt. % based on TiO$_2$ being produced.

The hot, gaseous suspension of TiO$_2$ pigment formed in the reactor was separated from the gas stream and quickly cooled in a conduit to a temperature of about 180° to 200° C. The scouring particles were introduced into the gaseous suspension at the front end of the conduit as the suspension was discharged from the reactor. A substantial 100% conversion of TiCl$_4$ and AlCl$_3$ to their respective oxides was obtained to produce a pigment containing about 99% rutile TiO$_2$ and about 1% Al$_2$O$_3$. The recovered base TiO$_2$ pigment was then tested for carbon black undertone (CBU) with the results reported below in Table 1.

The particle size distribution of the sodium chloride scouring particles in Comparative Examples A and B was such that at least 90% of the particles had a diameter size greater than 8 mesh (2.36 mm or 0.0937 inches) and at least 98% of the particles had a diameter size greater than 12 mesh (1.70 mm or 0.0661 inches). The particle size distribution for the potassium chloride scouring particles in Example 1 was such that about 88% of the particles had a diameter size greater than 10 mesh (2.00 mm or 0.0787 inches). The particle size distribution for the potassium chloride scouring particles in Example 2 was such that about 72% of the particles had a diameter size greater than 10 mesh.

TABLE 1

| Example | Metal Nucleant (ppm) | Scouring Particles | CBU |
|---|---|---|---|
| Comparative A | KCl (190) | NaCl | 14.2 |
| 1 | KCl (190) | KCl | 15.7 |
| Comparative B | CsCl (200) | NaCl | 15.2 |
| 2 | CsCl (200) | KCl | 17.3 |

As can be seen from Table 1, CBU improves when KCl scouring particles are used versus NaCl scouring particles. It is expected that using CsCl scouring particles or mixtures of KCl and CsCl scouring particles would provide similar improvements. The highest CBU values were obtained with CsCl as the nucleant (200 ppm) and KCl as the scouring particles.

What is claimed is:

1. In an improved process for producing titanium dioxide pigment, comprising the steps of:
    a) mixing a titanium tetrahalide and aluminum halide and oxidizing the mixture in the vapor phase in the presence of a nucleant selected from the group consisting of KCl, CsCl, and mixtures thereof to form a gaseous suspension of titanium dioxide particulate;
    b) passing the suspension of titanium dioxide particulate to a cooling conduit; the improvement comprising introducing into the cooling conduit scouring particles comprising a water soluble salt selected from the group consisting of KCl, CsCl, and mixtures thereof.

2. The process of claim 1, wherein the titanium tetrahalide is titanium tetrachloride.

3. The process of claim 1, wherein the aluminum halide is aluminum chloride.

4. The process of claim 1, wherein the titanium tetrahalide is titanium tetrachloride and the aluminum halide is aluminum chloride.

5. The process of claim 4, wherein the oxidation of the titanium tetrachloride occurs by mixing and reacting the titanium tetrachloride and an oxygen containing gas in the presence of water vapor in a reactor having a reaction zone at a temperature of at least about 800° C. and at a pressure of at least 10 pounds per square inch gage.

6. The process of claim 4, wherein the oxidation of the titanium tetrachloride occurs by mixing and reacting the titanium tetrachloride and an oxygen containing gas in the presence of water vapor in a reactor having a reaction zone and mixing zone, wherein the temperature in the reaction zone is at least about 800° C. and the residence time of the reactants in the mixing zone is about 1 to 25 milliseconds.

7. The process of claim 1, wherein the water soluble salt is KCl.

8. The process of claim 1, wherein the water soluble salt is KCl and the nucleant is KCl.

9. The process of claim 1, wherein the water soluble salt is KCl and the nucleant is CsCl.

10. The process of claim 8 or 9, wherein the diameter size of the KCl particles is in the range of about 60 mesh to about 0.5 inches.

11. The process of claim 1, wherein the water soluble salt is CsCl.

12. The process of claim 1, wherein the water soluble salt is CsCl and the nucleant is KCl.

13. The process of claim 1, wherein the water soluble salt is CsCl and the nucleant is CsCl.

14. The process of claim 12 or 13, wherein the diameter size of the CsCl particles is in the range of about 60 mesh to about 0.5 inches.

* * * * *